United States Patent [19]
Genter et al.

[11] Patent Number: 5,870,928
[45] Date of Patent: Feb. 16, 1999

[54] ANTI-LASH GEAR WITH ALIGNMENT DEVICE

[75] Inventors: David P. Genter, Kenilworth, England; Charles E. Long, Columbus, Ind.; Ilya L. Piraner, Columbus, Ind.; Dennis R. Tibbetts, Columbus, Ind.

[73] Assignee: Cummins Engine Company, Inc., Columbus, Ind.

[21] Appl. No.: 853,341

[22] Filed: May 8, 1997

[51] Int. Cl.⁶ .............................. F16H 57/12; F16H 55/18
[52] U.S. Cl. ................................. 74/440; 74/409
[58] Field of Search ..................... 74/409, 440

[56] References Cited

U.S. PATENT DOCUMENTS

| | | | |
|---|---|---|---|
| 1,033,468 | 7/1912 | Raymond | 74/440 |
| 1,755,945 | 4/1930 | Alexandrescu . | |
| 2,147,027 | 2/1939 | Grier | 74/397 |
| 2,397,777 | 4/1946 | Colman | 74/409 |
| 2,436,746 | 2/1948 | Drought | 74/397 X |
| 2,444,734 | 7/1948 | Gillett | 74/397 X |
| 2,607,238 | 8/1952 | English et al. | 74/440 |
| 3,347,110 | 10/1967 | Wilson | 74/397 |
| 3,365,973 | 1/1968 | Henden | 74/409 |
| 3,397,589 | 8/1968 | Moore | 74/397 |
| 3,407,727 | 10/1968 | Fischer | 74/440 X |
| 3,496,865 | 2/1970 | Fischer | 74/440 X |
| 3,502,059 | 3/1970 | Davis et al. | 123/90 |
| 3,523,003 | 8/1970 | Hambric | 74/409 X |
| 3,648,534 | 3/1972 | Fagarazzi | 74/440 |
| 4,380,991 | 4/1983 | Richter et al. | 74/397 X |
| 4,422,344 | 12/1983 | Wutherich | 74/409 |
| 4,700,582 | 10/1987 | Bessette | 74/409 |
| 4,719,813 | 1/1988 | Chalik | 74/409 |
| 4,739,670 | 4/1988 | Tamita et al. | 74/409 |
| 4,747,321 | 5/1988 | Hannel | 74/440 |
| 4,770,054 | 9/1988 | Ha | 74/409 |
| 4,781,073 | 11/1988 | Bondhus et al. | 74/440 |
| 4,920,828 | 5/1990 | Kameda et al. | 74/409 X |
| 4,953,417 | 9/1990 | Baumgarten et al. | 74/409 |
| 5,017,178 | 5/1991 | Krikke et al. | 74/411 X |
| 5,056,613 | 10/1991 | Porter et al. | 74/440 X |
| 5,119,687 | 6/1992 | Naruoka et al. | 74/409 X |
| 5,146,804 | 9/1992 | Carmillet | 74/440 |
| 5,181,433 | 1/1993 | Ueno et al. | 74/409 |
| 5,492,029 | 2/1996 | Obrist | 74/409 |
| 5,540,112 | 7/1996 | Baker et al. | 74/409 |

FOREIGN PATENT DOCUMENTS

| | | | |
|---|---|---|---|
| 651906 | 8/1994 | Australia . | |
| 212 567 | 8/1984 | Germany | 74/397 |
| 60-95272 | 5/1985 | Japan | 74/440 |
| WO 93/00530 | 1/1993 | WIPO | 74/440 |

OTHER PUBLICATIONS

Article entitled "18 Ways to Control Backlash in Gearing", Product Engineering, Oct. 26, 1989, pp. 71–75.

*Primary Examiner*—Allan D. Herrmann
*Attorney, Agent, or Firm*—Woodard, Emhardt, Naughton Moriarty & McNett

[57] ABSTRACT

An engine system with a gear train to provide engine timing is disclosed. A technique to minimize backlash and noise caused by the gear train is included. An anti-backlash gear assembly useful to reduce backlash in the gear train is also disclosed. One disclosed gear assembly has at least two gear wheels with the circular thickness of the teeth of one gear wheel being less than the circular thickness of the other gear wheel. A gear assembly is also disclosed that has a bias torque of at least about 100 foot-pounds. A device carried on an anti-lash gear assembly to generally align teeth of the assembly for installation is also provided.

23 Claims, 15 Drawing Sheets

ANTI-LASH GEAR WITH ALIGNMENT DEVICE

BACKGROUND OF THE INVENTION

The present invention relates to gears, and more particularly, but not exclusively, relates to reduction of backlash in gear trains.

When the tooth of one gear mates with the gap of another gear, the gap typically provides more space than needed to accommodate the tooth. This excess space is sometimes called "lash" or "backlash." Backlash may vary with a number of factors including radial play in the gear bearings, gear shaft eccentricity, incorrect center-to-center spacing of the gears, and the gear-to-gear variation typical of many gear manufacturing processes.

The extra space associated with backlash usually leads to significant impact loading of the gear teeth. This loading often causes excessive noise and may result in other gear train problems. For example, backlash may accelerate gear wear. Backlash reduction is of particular concern for internal combustion engine applications—especially for gear trains used with diesel engines. U.S. Pat. Nos. 5,450,112 to Baker et al., 4,920,828 to Kameda et al., 4,700,582 to Bessette, and 3,523,003 to Hambric are cited as sources of background information concerning the application of gear trains to various engines.

One way to reduce backlash is through precision machining and mounting of the gears. However, this approach is usually expensive and still may not adequately address backlash that changes over time due to wear. Another approach to reduce backlash has been the introduction of one or more scissor gears into the gear train. Generally, scissor gears have teeth which adjust in size to occupy the space available between teeth of a mating gear. U.S. Pat. Nos. 5,056,613 to Porter et al., 4,747,321 to Hannel, 4,739,670 to Tomita et al., 3,365,973 to Henden, and 2,607,238 English et al. are cited as examples of various types of scissor gears.

Backlash accommodation with a scissor gear is often limited when the scissor gear is meshed with two or more gears having different amounts of lash. Typically, the mating gear having the smallest amount of lash dictates the effective tooth size of the scissor gear; however, this size is generally inadequate to take-up the greater lash of the other mating gear or gears. One potential solution to this problem is to select mating gears which minimize the lash difference, but this "lash matching" approach is typically expensive and time-consuming. Consequently, a need remains for a gear train assembly which accommodates lash differences resulting from multiple gears meshing with a scissor gear.

One scissor gear configuration has two toothed wheels spring-biased to rotate relative to each other about a common center. For this configuration, paired gear teeth, one from each wheel, spread to occupy the available space between teeth in a mating gear. In some gear trains, loading of the tooth pairs by the mating gear becomes high enough to align each tooth pair in opposition to the spring bias. Typically, each member of the aligned pair is configured to proportionally bear this high load by being sized with the same nominal thickness. However, it has been found that random deviations from nominal are usually enough to cause one tooth or the other of each pair to bear a disproportionately high amount of the load until it has deformed enough to match the other tooth. This deformation process often subjects the gear teeth to reverse bending loads that more quickly wear-out the teeth compared to teeth subjected to unidirectional bending loads. Also, such deformation may cause greater tooth-to-tooth variation, resulting in poorer performance and a more noisy gear train. Therefore, a need exists for an anti-lash gear assembly which accommodates high loading without these drawbacks.

It has also been discovered that the knocking of heavy duty diesel engines, often attributed to combustion processes, results from high impact gear tooth noise. Typically, this noise is not sufficiently abated by conventional scissor gear configurations. Thus, a gear train is also in demand which addresses this type of noise.

SUMMARY OF THE INVENTION

The present invention relates to anti-lash gear assemblies and gear trains utilizing one or more anti-lash gear assemblies. Various aspects of the invention are novel, non-obvious, and provide various advantages. While the actual nature of the invention covered herein can only be determined with reference to the claims appended hereto, certain features which are characteristic of the preferred embodiments disclosed herein are described briefly as follows.

In one form of the present invention, a gear train is assembled by providing a first gear and establishing a first mesh between the first gear and a second gear. The second gear is of a scissor gear configuration with an effective tooth size determined by the first mesh. A mounting position for a third gear is selected to form a second mesh with the second gear. This mounting position is determined as a function of the effective tooth size to control backlash of the second mesh.

In another form, an engine system incorporating a gear train is provided. This system includes an internal combustion engine to which first, second, and third gears are pivotally coupled. The second gear engages the first gear in a first mesh, and the third gear engages the second gear in a second mesh. The second gear is of a scissor gear configuration. This system also includes an adjustable positioning mechanism adapted to provide a range of positions of the rotational axis of the third gear relative the rotational axis of the second gear to control backlash for the second mesh. One advantage of these forms of the present invention is that lash difference between two gears meshing with a scissor gear is addressed.

In another form of the present invention, an anti-lash gear assembly is provided which includes a first gear wheel with a first number of circumferentially disposed teeth and a second gear wheel engaged to the first wheel with a spring bias configured to yielding rotate said first and second wheels relative to each other about a generally common rotational center. The second wheel defines a number of circumferentially disposed teeth each paired to a corresponding one of the first teeth. Each tooth pair has a composite thickness determined in accordance with a force acting against the bias. The first teeth each have a first circular thickness and the second teeth each have a second circular thickness nominally less then the first thickness. Generally, this thickness difference shifts loading in excess of the bias to the first wheel to reduce reverse bending loads.

In a further form of the present invention, an anti-lash gear assembly, such as a scissor gear, is provided with a high maximum bias torque to address knocking sounds of diesel engines. Generally, the maximum bias torque necessary to reduce these sounds is selected as a function of the specific engine design and expected loading. In one preferred embodiment, a maximum bias torque of at least about 100 foot-pounds is employed. In a more preferred embodiment, at least about a 200 foot-pound maximum bias torque is utilized. In a still more preferred embodiment, at least about a 500 foot-pound maximum bias torque is employed. Although generally contrary to accepted wisdom, this relatively high bias torque has been found to reduce unpleasant hammering or knocking sounds associated with some diesel engines.

In yet another form, an anti-lash gear assembly is provided that includes a first gear wheel with a first number of circumferentially disposed teeth and a first number of splines. This assembly also includes a second gear wheel with a second number of circumferentially disposed teeth and a second number of splines. The first and second splines engage each other about a generally common rotational axis and are inclined relative to this axis to rotate the first and second wheels relative to each other. The first and second teeth are paired to provide a number of composite teeth varying in size with rotation of the first and second wheels relative to each other.

In another form, an anti-lash gear assembly has a first gear wheel with a first number of circumferentially disposed teeth and a second gear wheel engaging the first wheel with a spring bias configured to yieldingly rotate the first and second wheels relative to each other about a common rotational axis. The second wheel defines a second number of teeth each paired to a corresponding one of the first teeth to provide a number of composite teeth of variable thickness to reduce backlash. An alignment device is also included with a threaded stem carried by the first wheel and a head. The head is selectively positionable relative to the first wheel to provide an adjustable bearing relationship with the second wheel in opposition to the bias to correspondingly vary alignment of the first and second teeth. Preferably, the head has one position which generally aligns the first and second teeth to facilitate installation of the assembly into a gear train.

Other forms of the present invention include incorporating the various anti-lash gear assemblies of the present invention into a gear train and utilizing the various gear trains of the present invention with an internal combustion engine.

Accordingly, it is one object of the present invention to reduce backlash of a gear train assembly having a scissor gear by positioning a mating gear to mesh with the scissor gear having an effective tooth size determined by another mesh.

It is a further object to reduce noise emitted by engine gear trains.

Another object of the present invention is to provide an anti-lash gear assembly which reduces gear train noise emissions.

Still another object is to provide an anti-lash gear assembly which improves noise emissions by applying a comparatively high biasing torque.

It is another object of the present invention to control load sharing between multiple gear wheels of a scissor gear assembly.

Yet another object is to provide a reliable anti-lash gear assembly which is easy to install.

Further objects, features, advantages, and aspects of the present invention will become apparent from the drawings and description contained herein.

DESCRIPTION OF THE PREFERRED EMBODIMENT

Figure 1:
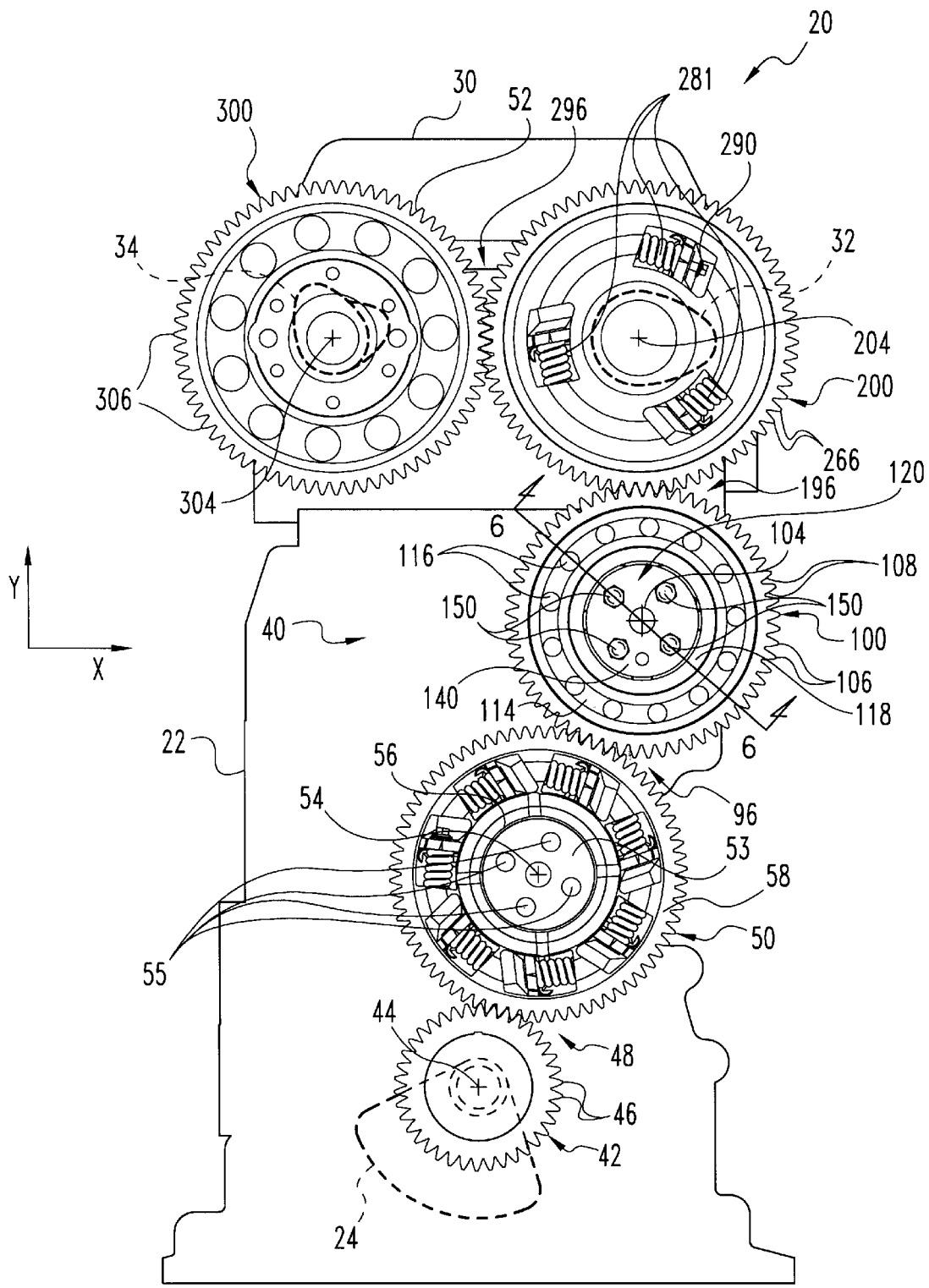
FIG. 1 is a front elevational view of an internal combustion engine system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 depicts internal combustion engine system 20 of the present invention. System 20 includes engine block 22 with a crankshaft 24 shown in phantom. Engine system 20 also includes head assembly 30 connected to block 22. Head assembly 30 includes fuel injector camshaft 32 shown in phantom and valve camshaft 34 shown in phantom. In one embodiment, block 22 and head assembly 30 are configured as a heavy duty, in-line six cylinder diesel engine. The present invention is also applicable to other types of engines as would occur to one skilled in the art.

System 20 includes timing gear train 40. Gear train 40 includes drive gear 42 connected to crankshaft 24. Crankshaft 24 and drive gear 42 have rotational center 44 at the intersection of the crosshairs designated by reference numeral 44. For the figures referenced herein, centers of rotation are depicted by a broken line segment indicative of the corresponding rotational axis when the rotational axis is not perpendicular to the view plane and by crosshairs when the rotational axis is perpendicular to the view plane. Gear 42 rotates with crankshaft 24 during operation of engine system 20 about center 44 to drive the remaining gears of gear train 40.

Gear 42 has teeth 46 which form mesh 48 with lower idler anti-lash gear 50. Gear 50 rotates about shaft 53 having rotational center 54. Shaft 53 is mounted to block 22 by fasteners 55. Bearing 56 provides a rotational bearing relationship between anti-lash gear assembly 58 of gear 50 and shaft 53.

Figure 2:
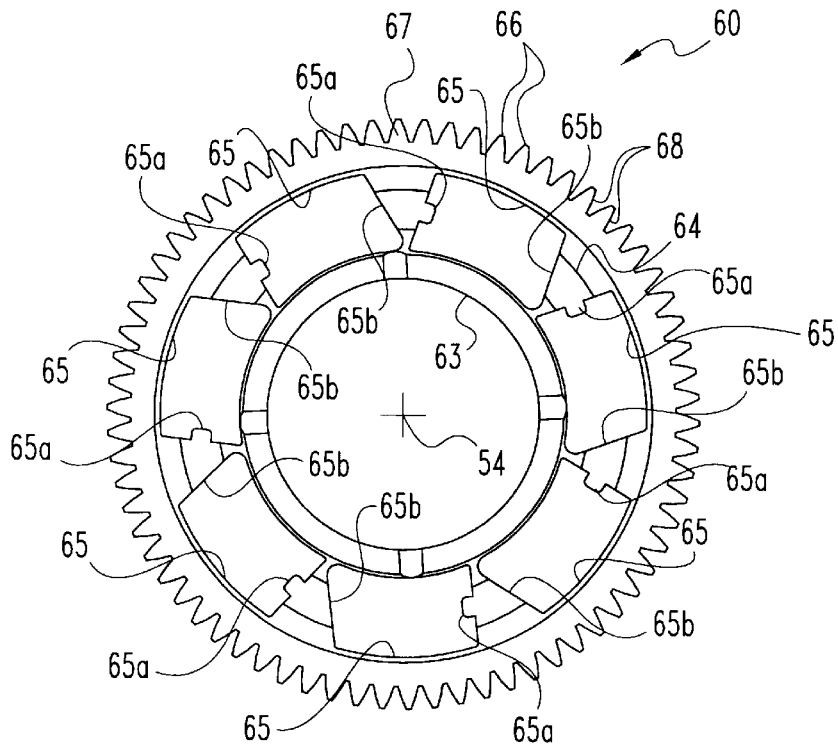
FIGS. 2 and 3 are top plan views of components of an anti-lash gear assembly for the embodiment of FIG. 1.

FIGS. 2–5 provide additional details concerning the structure and operation of anti-lash gear assembly 58 of gear 50. Referring to FIG. 2, various details of gear wheel 60 prior to incorporation into gear assembly 58 are shown. Gear wheel 60 includes a hub 63. Web 64 defines seven circumferentially spaced apart apertures 65. Furthermore, for each aperture 65, web 64 defines a fingered edge 65a at one end opposing edge 65b at another end. Aperture 65 and edges 65a, 65b are generally evenly spaced along the circumference of an imaginary circle about center 54. Gear wheel 60 includes a number of circumferentially spaced-apart gear teeth 66 defined by rim 67. Rim 67 is integrally connected to hub 63 by web 64. Adjacent members of gear teeth 66 are generally evenly spaced-apart from one another by gaps 68. Only a few of teeth 66 and gaps 68 are designated to preserve clarity. Each member of gear teeth 66 is generally sized and shaped the same as the others. Similarly, each gap 68 generally has the same size and shape.

Figure 3:
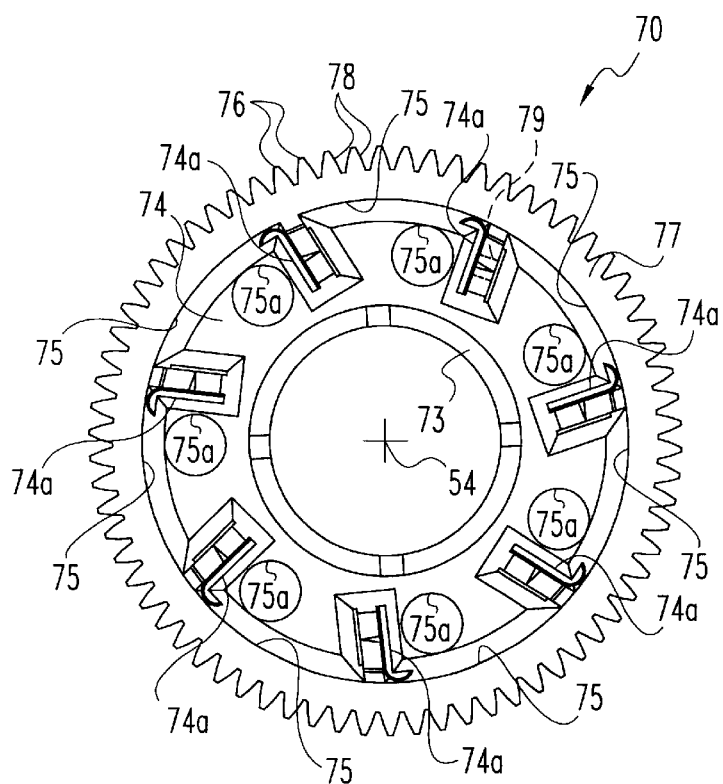

Referring to FIG. 3, gear wheel 70 of anti-lash assembly 58 is illustrated. Gear wheel 70 includes hub 73 which is configured to form a rotary bearing relationship with shaft 53 via bearing 56 (see FIG. 1). Hub 63 of gear wheel 60 engages hub 73. The interface between hubs 63 and 73 is adapted to permit rotation of gear wheels 60 and 70 relative to each other. Gear wheel 70 also includes web 74. Tabs 74a project from web 74 in a direction generally perpendicular to the view plane of FIG. 3 and have one side connected to rim 77 to define corresponding recesses 75. At least one tab 74a defines threaded bore 79 therethrough. Bore 79 has a longitudinal axis generally parallel to the view plane of FIG. 3. Web 74 also defines lightening holes 75a each corresponding to one of recesses 75. Tabs 74a and recesses 75 are generally evenly spaced along the circumference of an imaginary circle about center 54.

Wheel 70 includes a number of gear teeth 76 defined by rim 77. Rim 77 is integrally connected to hub 73 by web 74. Adjacent members of gear teeth 76 are generally evenly spaced-apart from one another by gaps 78. Only a few of teeth 76 and gaps 78 are designated to preserve clarity. Each member of gear teeth 76 is generally sized and shaped the same as the others. Similarly each gap 78 generally has the same shape and size. Preferably, the number of teeth 76 of wheel 70 is the same as the number of teeth 66 of wheel 60.

Figure 4:
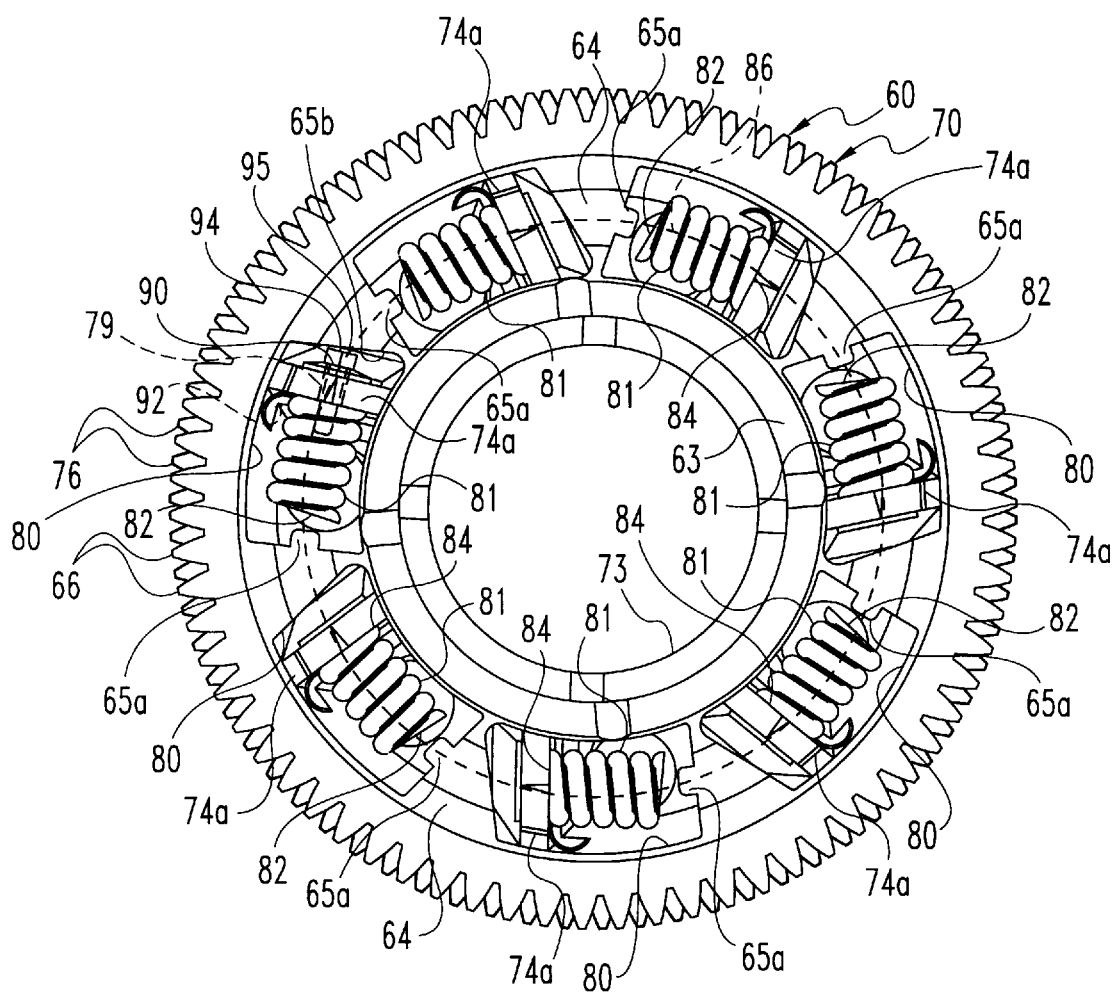
FIG. 4 is a top plan view of the components of FIGS. 2 and 3 incorporated into the anti-lash gear assembly in an unaligned configuration.

FIG. 4 defines anti-lash gear assembly 58 in an unaligned configuration commonly encountered prior to preparation for installation in gear train 40. In this configuration, wheels 60 and 70 loosely engage each other so that each aperture 65 of wheel 60 generally overlaps a corresponding recess 75 of wheel 70 to define a number of pockets 80. A number of coil springs 81 are provided each having end 82 opposite end 84. Each spring 81 is positioned in a corresponding one of pockets 80 with end 82 engaging a corresponding tab 74a and end 84 aligning with a corresponding edge 65a. However, ends 84 do not typically engage edges 65a in this configuration.

Assembly 58 also includes adjustment bolt 90 having threaded stem 92 opposing head 94. Stem 92 is shown fully threaded into bore 79 in FIG. 4 with head 94 in contact with corresponding tab 74a. By convention, teeth 66 and 76 are in an "unaligned" position such that teeth 66 overlap gaps 78 defined between teeth 76, and teeth 76 overlap gaps 68 defined between teeth 66. Hub 73 of wheel 70 forms a rotary bearing relationship with hub 63 of wheel 60 so that wheels 60 and 70 are permitted to rotate relative to one another. Head 94 defines contact surface 95 configured to bear against adjacent edge 65b of wheel 60 when wheel 60 is rotated counter-clockwise relative to wheel 70. When wheel 60 is rotated in the clockwise direction relative to wheel 70, spring ends 84 eventually engage corresponding edges 65a. Preferably, each edge 65a defines a finger sized to fit inside the coil of each spring 81 to facilitate proper alignment with wheel 60. When rotated in the clockwise direction with sufficient force, springs 81 are compressed between corresponding edges 65a and tabs 74a, as illustrated in FIG. 5.

Figure 5:
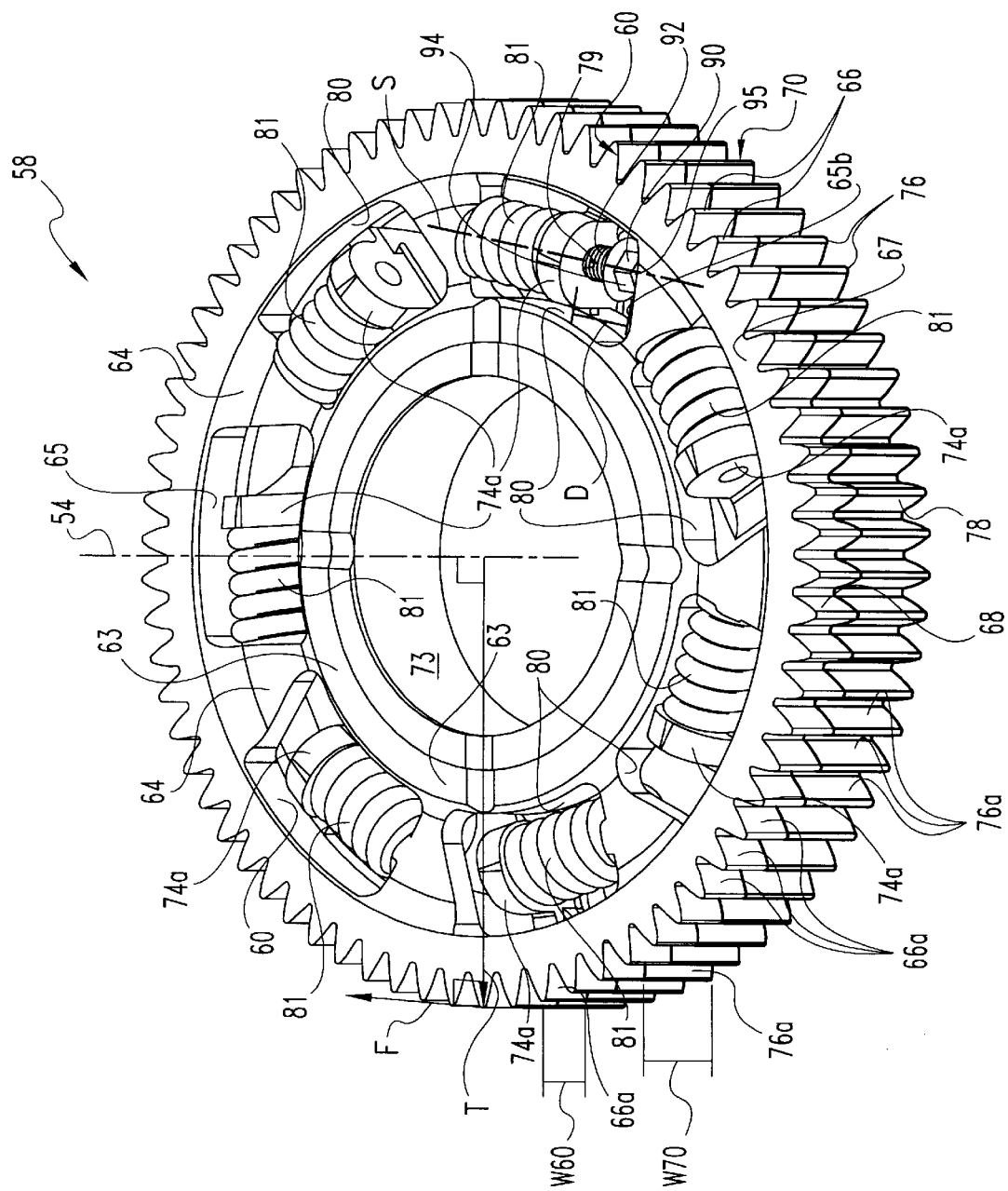
FIG. 5 is a perspective view of the anti-lash gear assembly of FIG. 4 in an aligned configuration.

FIG. 5 depicts an "aligned" position of gear wheel 60 and 70 reflecting a configuration suitable for installation in gear train 40. When aligned, teeth 76 and 66 are approximately centered over one another as depicted in FIG. 5. Springs 81 are also in a highly compressed condition between edges 65a and tabs 74a to provide a correspondingly high spring force. Adjusting assembly 58 from the configuration of FIG. 4 to the configuration of FIG. 5 is provided by unthreading bolt 90 so that head 94 moves away from bore 79 along stem axis S. As this unthreading continues, surface 95 bears against adjacent edge 65b and springs 81 are compressed between adjacent aligned tabs 74a and edges 65a.

Unthreading of bolt 90 spreads apart the associated tab 74a and edge 65b to rotate wheels 60 and 70 relative to one another and move teeth 66 and 76 past each other. A given tooth of wheel 66 may move into and out of registration with several teeth 76 before reaching the highly biased configuration of FIG. 5 from the unbiased configuration of FIG. 4.

FIG. 5 also depicts face 66a of each tooth 66 of wheel 60 a few of which are depicted. Each tooth 76 of wheel 70 similarly has a face 76a, a few of which are depicted. Width W60 represents the width of a typical face 66a. Similarly, width W70 represents the width of a typical face 76a. Preferably, width W60 is less than width W70. More preferably, width W70 is at least about 50% greater than width W60. Most preferably, width W70 is at least about twice width W60.

Referring collectively to FIGS. 4 and 5, anti-lash gear wheel assembly 58 is constructed by providing wheel 70 and mounting one of springs 81 to align with bore 79. Bolt 90 is threaded into bore 79 so that head 94 contacts the associated tab 74a. The remaining springs 81 are placed in recesses 75 of wheel 70. Wheel 60 is placed over wheel 70 to define corresponding pockets 80 generally evenly spaced along imaginary circle 86 (shown in phantom in FIG. 4). Edges 65a align with ends 84 of corresponding springs 81.

Prior to mounting assembly 58 on shaft 53, it is preferred that teeth 66 and 76 be aligned. To provide this alignment, bolt 90 is partially unthreaded from bore 79 so that head 94 contacts adjacent edge 65b of wheel 60 and correspondingly compresses springs 81. In response, teeth 66, 76 move past one another. Unthreading of bolt 90 continues this motion until the aligned position of FIG. 5 is generally reached. As a result, wheel 60 is separated from wheel 70 along stem axis S by distance D as illustrated in FIG. 5. Notably, a portion of stem 92 of bolt 90 remains threaded in bore 79 in both the unaligned position of FIG. 4 and in the aligned position of FIG. 5. In other embodiments, more than one or all of tabs 74a may be adapted to define a bore 79 suitable for engagement by bolt 90. Similarly, multiple bolts 90 may be employed with embodiments having multiple bores 79.

Once teeth 66 and 76 are aligned in the configuration of FIG. 5, assembly 58 is mounted to shaft 53 via bearing 56.

When so mounted, the aligned teeth 66, 76 form mesh 48 with teeth 46 of drive gear 42. However, mesh 48 typically has a significant amount of lash when teeth 66, 76 are forcibly aligned by the extension of bolt 90. To take-up this lash with gear 50, wheels 60 and 70 are preferably permitted to rotate relative to one another under the influence of the bias provided by compressed springs 81. Threading bolt 90 back into bore 79 once assembly 58 is mounted to form mesh 48 with drive gear 42 permits this rotation. As a result, the spring bias offsets teeth 66 and 76 from one another to generally occupy the entire space between adjacent teeth 46 participating in mesh 48. Notably, mesh 48 does not permit teeth 66, 76 to return to the unloaded position of the FIG. 4 configuration.

Each pair of initially aligned teeth 66, 76 operate collectively as a composite tooth with a variable effective size or "thickness" dependent upon the space between mating teeth 46. By varying in thickness, these composite teeth may reduce, or even effectively eliminate, backlash in mesh 48. To conclude installation of assembly 58, bolt 90 should be tightened down so that head 94 bears against the associated tab 74a. Bolt 90 is preferably carried by wheel 70 throughout the adjustment process and utilization of assembly 58 as part of gear 50.

Preferably, wheel 60 and 70 are machined from a metallic material suitable for long-term use in a diesel engine timing gear train. It is also preferred that bolt 90 and springs 81 be selected from compatible materials suitable for long term use in a diesel engine environment. Nonetheless, in other embodiments, different materials may be used as would occur to one skilled in the art.

Although gear 50 is illustrated in FIG. 1 as an idler gear, in other configurations it may be configured as a driving gear, a driven gear, or otherwise adapted or modified as would occur to one skilled in the art. In all these forms, gear 50 may be considered to be a novel type of "scissor gear."

Referring back to FIG. 1, gear 50 participates in gear train 40 to form mesh 96 with idler gear 100. Idler gear 100 rotates about rotational center 104 and defines circumferential teeth 106 spaced apart by gaps 108 to form mesh 96 with gear 50.

Figure 6:
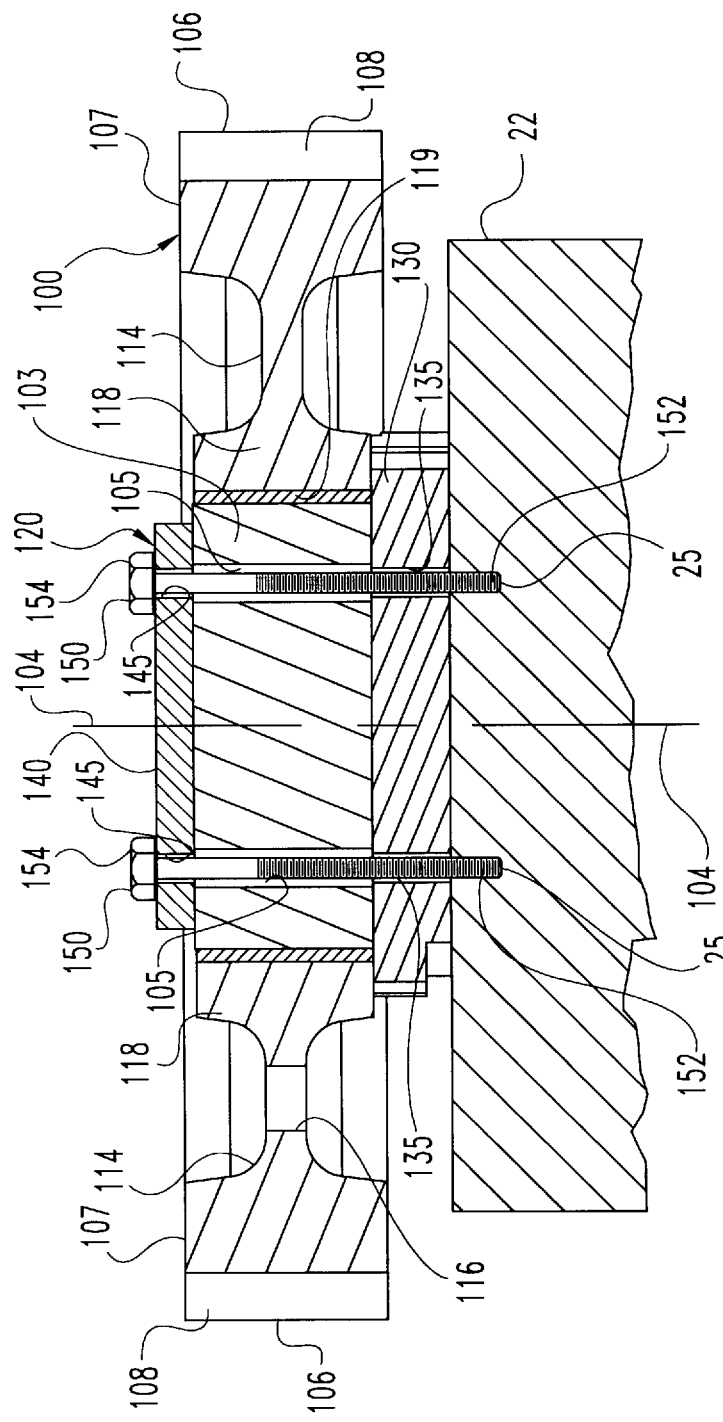
FIG. 6 is an cross-sectional view of an idler gear and adjustable positioning mechanism along section lines 6—6 of FIG. 1.

Referring additionally to FIG. 6, further details concerning idler gear 100 are provided. Idler gear 100 includes rim 107 defining teeth 106 integrally connected to web 114. Web 114 defines lightening holes 116. Web 114 is also integrally connected to hub 118 which, as shown in the cross-sectional view of FIG. 6, has slightly less thickness along the rotational axis corresponding to center 104 than rim 107. Cylindrical bushing 119 provides a rotational bearing surface between shaft 103 and hub 118. Shaft 103 defines four passages 105 used to mount idler gear 100 to block 22.

Mounting of idler gear 100 is provided by adjustable positioning mechanism 120. Mechanism 120 includes a mounting plate 130 which is positioned between shaft 103 of idler gear 100 and block 22. Notably, plate 130 is configured to provide clearance with hub 118 of idler gear 100 so that idler gear 100 may freely rotate about shaft 103.

Idler gear 100 and mounting plate 130 are positioned between block 22 and retaining plate 140. Retaining plate 140 includes mounting holes 145 which are generally aligned with mounting passages 105 of shaft 103, mounting passages 135 of plate 130, and threaded bores 25 of block 22. Notably passages 105 have a larger dimension along an axis perpendicular to the rotational axis of gear 100 than passages 135, holes 145, and bores 25. Idler gear 100 is secured between plates 130 and 140 by inserting cap screw fasteners 150 through holes 145, passages 105, and passages 135 and threading the end of threaded stems 152 into bores 25. Fasteners 150 each have head 154 opposing threaded stem 152. Head 154 is sized to contact retaining plate 140 when stems 152 are fully threaded into bores 25 to clamp plate 140 against shaft 153 and to clamp shaft 153 against plate 130.

In operation, mechanism 120 is configured to position idler gear 100 relative to a planar region that is preferably parallel to the view plane of FIG. 1 and perpendicular to the view plane of FIG. 6. Within this region, gear 100 may be positioned with two degrees of freedom as symbolized by the X and Y directional arrows of FIG. 1.

To mount idler gear 100, mounting plate 130 is first secured to block 22 using fasteners (not shown) in a conventional manner so that passages 135 align with bores 25. Once plate 130 is secured to block 122, idler gear 100 is located on plate 130 so that passages 105 overlap passages 135. Next, retaining plate 140 is placed over shaft 103 to locate holes 145 over corresponding passages 105 and 135, and bores 25. Fasteners 150 are then each placed through an aligned hole 145, passage 105, and passage 135 and loosely threaded into a corresponding bore 25. Preferably, fasteners 150 are initially threaded into bores 25 an amount sufficient to contact plate 140 and yieldingly hold idler gear 100 in position. In this configuration, the position of idler gear 100 relative to the planar region symbolized by the X and Y directional arrows may be selected within the range permitted by the clearance of fasteners 150 in passages 105. Once an X-Y position is selected, fasteners 150 are tightened down to secure idler gear 100 and mechanism 120.

Teeth 106 of idler gear 100 form mesh 196 with anti-lash gear 200. Gear 200 is mounted to fuel injector camshaft 32 of head assembly 30 and is configured to rotate about rotational center 204. Gear 200 is preferably configured similar to gear 50 having composite gear tooth pairs represented by reference numeral 266. Furthermore, springs 281 of gear 200 are shown configured in a manner similar to springs 81 of gear 50, although fewer in number (three being shown). Likewise an installation adjustment bolt 290 is shown. This adjustment bolt may function for installation purposes similar to bolt 90 of gear 50. Gear 50, gear 200, or both may utilize belleville washers to provide a spring bias either with or without coil springs.

Gear 200 forms mesh 296 with mating gear 300. Mating gear 300 is attached to valve camshaft 34 to rotate about rotational center 304. Gear 300 defines teeth 306 which interface with tooth pairs 266 of gear 200 to form mesh 296.

In operation, drive gear 42 rotates with crankshaft 24 to turn gear 50. In response, gear 50 turns idler gear 100 via mesh 96. Idler gear 100 drives gear 200 via mesh 196 to regulate timing of fuel injectors (not shown) for engine system 20 by rotating fuel injector camshaft 32. Furthermore, gear 200 drives mating gear 300 via mesh 296 to rotate valve camshaft 34 therewith to time engine valves (not shown) for head assembly 30. Thus, gear train 40 turns camshafts 32 and 34 of head assembly 30 in response to rotation of crankshaft 24 to control timing of engine system 20.

In other embodiments, different quantities and arrangements of gears in gear train 40 may be utilized as would occur to one skilled in the art. In one alternative embodiment, a conventional scissor gear may be used in place of gear 50, gear 200, or both. In still other embodiments an idler gear with an adjustable positioning mechanism may not be required.

In one embodiment of gear train 40, the number of teeth 46 is about 48 for drive gear 42; the number of teeth 66, 76 is about 70 for gear wheels 60, 70, respectively; the number of teeth 106 for adjustable idler gear 100 is about 64; the number of composite teeth 266 for gear 200 is about 76 and the number of teeth 306 is about 76 for gear 300. Furthermore, for this configuration, gears 42, 50, 100, 200, 300 are of a spur gear configuration, are made from metallic materials suitable for long term use with internal combustion engines, and have generally parallel rotational axes which perpendicularly intersect the view plane of FIG. 1.

Figure 7A:
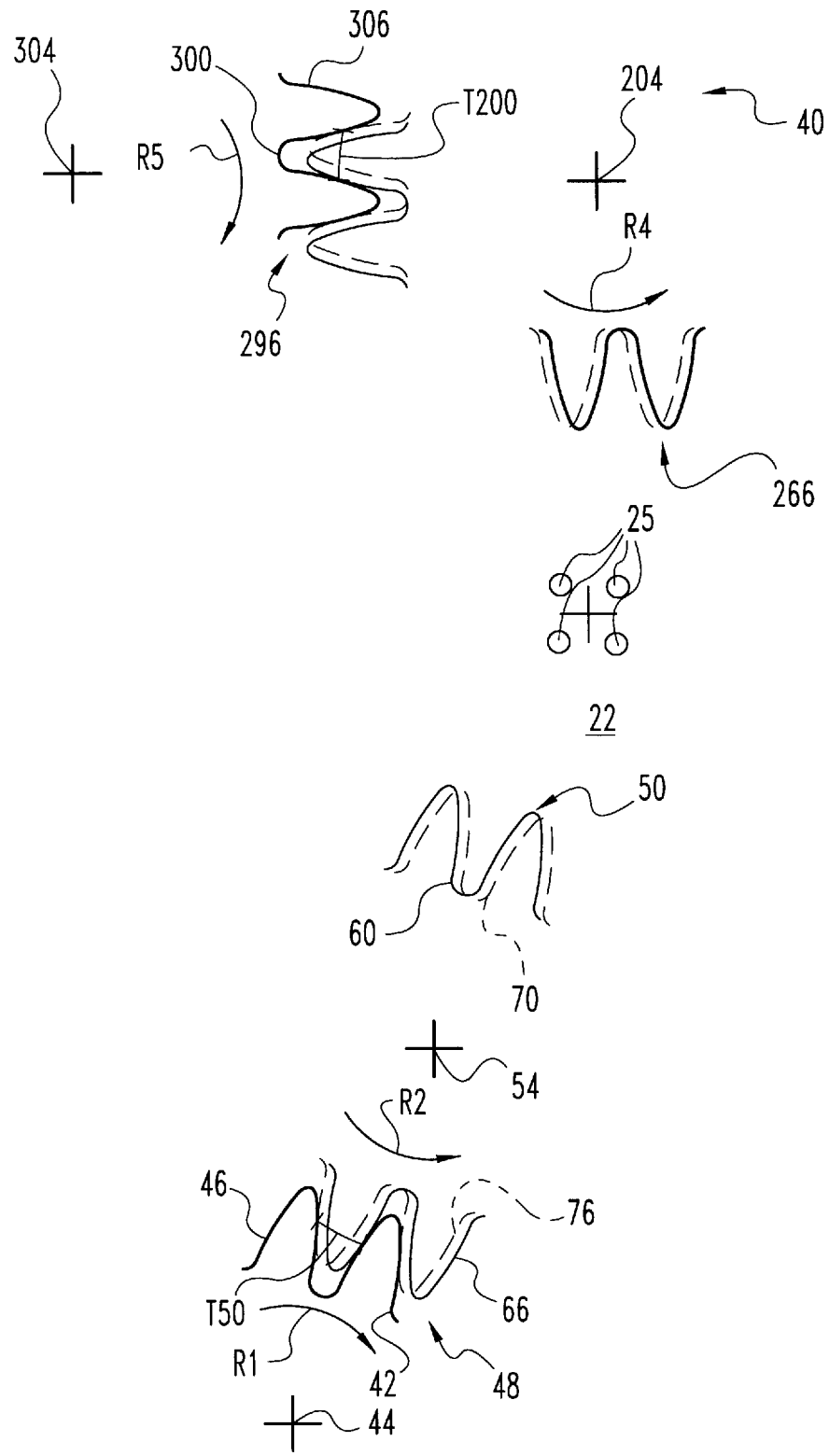
FIGS. 7A and 7B are schematic, front elevational views of the system of FIG. 1 at various stages of assembly.
Figure 7B:
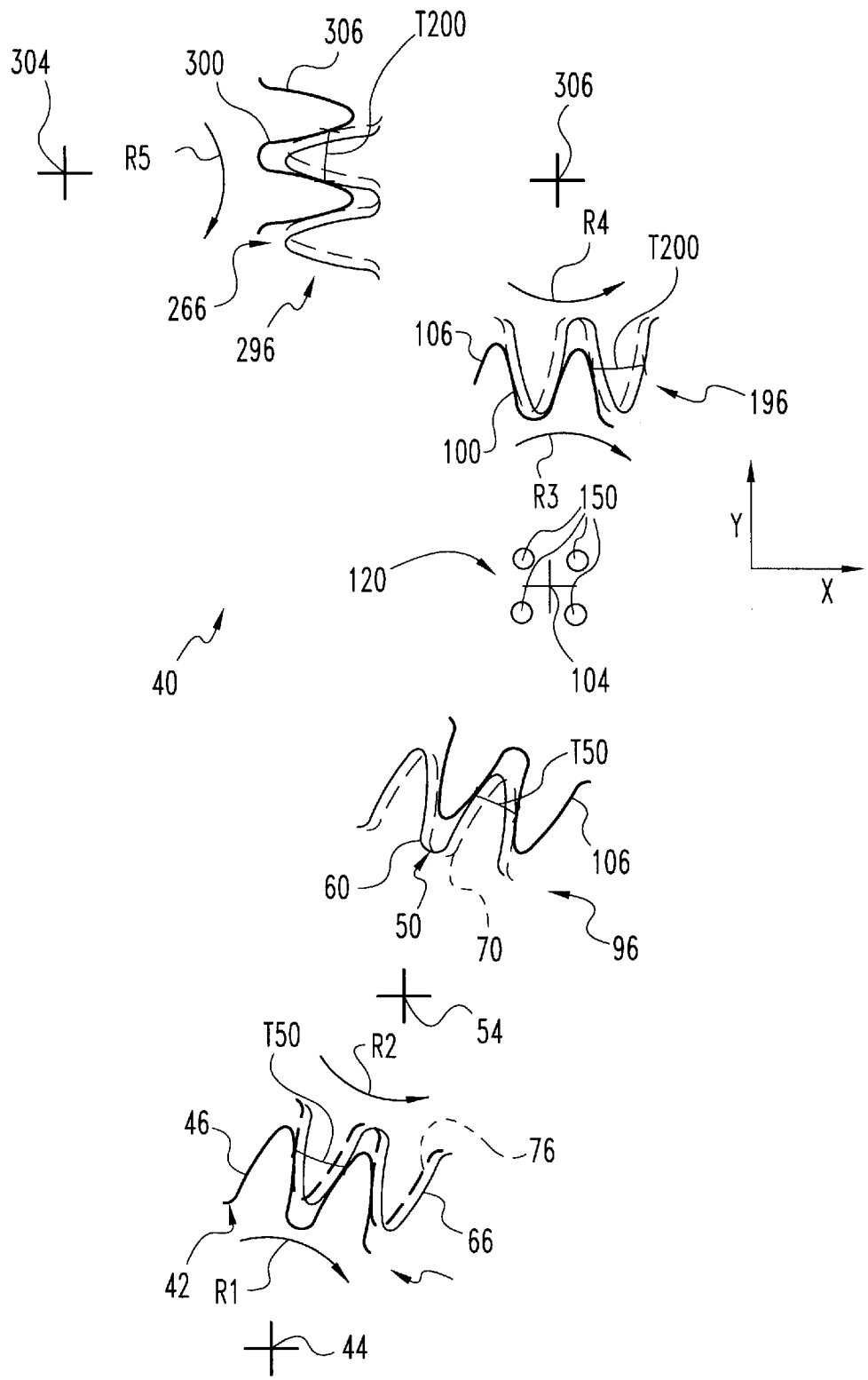

Having described selected structural and operational features of system 20, certain aspects concerning the assembly of system 20 are next described in connection with the schematic representations of FIGS. 7A and 7B. In FIGS. 7A and 7B, reference numerals schematically depict structure identified by like reference numerals in FIGS. 1–6; however, gear meshes have been enlarged to emphasize selected features of the present invention. FIG. 7A illustrates an intermediate assembly stage of drive train 40. In this stage, drive gear 42 has been previously mounted to rotate about center 44 in the direction indicated by arrow R1. Similarly, mating gear 300 has been mounted to rotate about center 304 in the direction indicated by arrow R5.

After gears 42 and 300 have been mounted, gears 50 and 200 are mounted to form mesh 48 between gears 42 and 50, and mesh 296 between gears 200 and 300. The formation of meshes 48, 296 determines the effective composite tooth size of corresponding pairs of teeth for gears 50 and 200 as they occupy gaps between teeth 46 and 306 of gears 42 and 300, respectively. For gear 50, teeth 76 of wheel 70 are represented by dashed lines, and teeth 66 of wheel 60 are represented by solid lines for illustrative purposes. The effective circular thickness T50 of one composite tooth pair of gear 50 is also shown. This composite circular thickness is determined along a pitch circle of gear 50 for mesh 48. Notably, in the absence of idler gear 100, thickness T50 is defined by the mating gap of teeth 46 of gear 42.

For mesh 296, gear 200 forms composite teeth pairs 266. Each pair 266 has a member represented by a dashed line and a member represented by a solid line to enhance clarity. The effective circular tooth thickness of one composite tooth pair 266 is shown as circular thickness T200 relative to a pitch circle for gear 200.

Arrows R4, R5 indicate the rotational direction in which gears 200, 300 are driven, respectively. Also indicated are mounting bores 25 of engine block 22 for reference.

Having defined the composite circular thicknesses T50 and T200, idler gear 100 is installed to form mesh 96 with gear 50 and mesh 196 with gear 200 as depicted in FIG. 7B. The tooth thicknesses T50 and T200 are typically different corresponding to a difference in the amount of backlash in meshes 48 and 296. By using mechanism 120 to adjust the X–Y position of rotational center 104 relative to fixed rotational centers 54 and 204, idler gear 100 may be located to optimally mesh with the pre-defined tooth sizes of gears 50 and 200 despite any lash difference. Fasteners 150 of mechanism 120 are illustrated in FIG. 7B for reference.

The positional adjustment of idler gear 100 relative to the other gears results in significant control over the amount of backlash in meshes 96 and 196. When the backlash difference resulting from different T50 and T200 widths is within a certain range, backlash may be reduced, or even effectively eliminated, through proper placement of idler gear 100 along a planar region perpendicular to the rotational axes of the meshing gears.

Notably, while the preferred embodiment presents two meshes 96, 196 with idler gear 100, in other embodiments this assembly method may be practiced to control backlash for a different quantity of meshing gears. For example, this assembly technique finds application in gear trains having only three gears oriented similar to gears 42, 50, and 100.

Figure 8A:
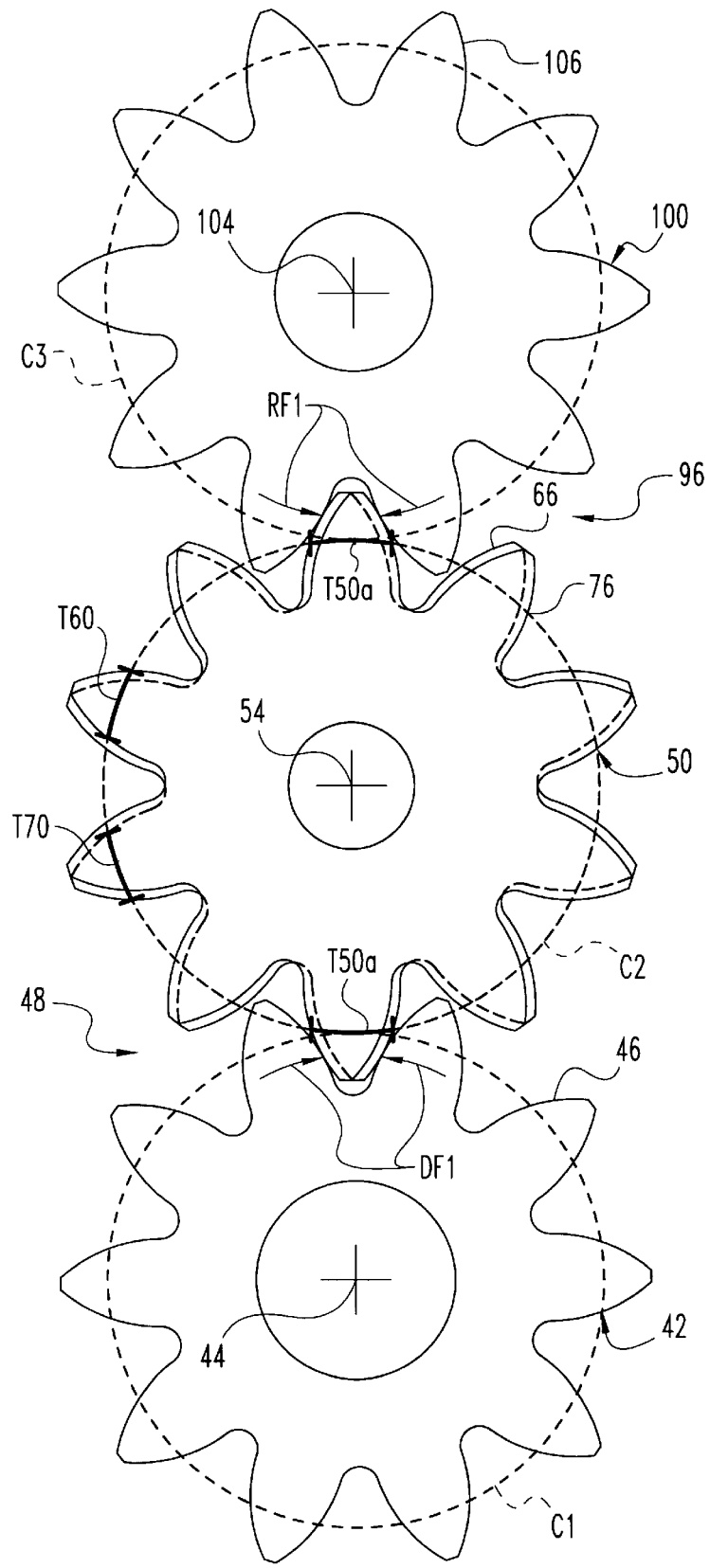
FIGS. 8A–8C are schematic, front elevational views depicting selected operational states of a portion of the system of FIG. 1.
Figure 8B:
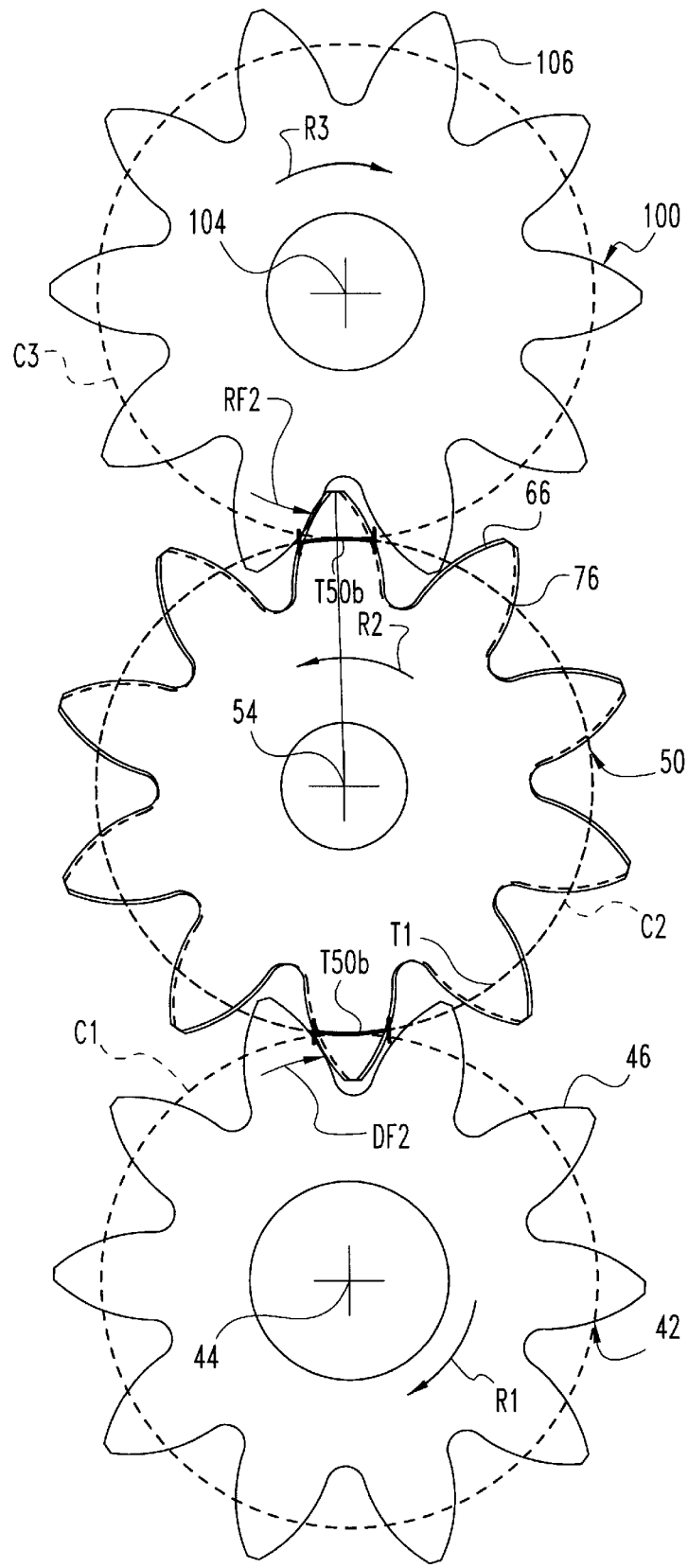
Figure 8C:
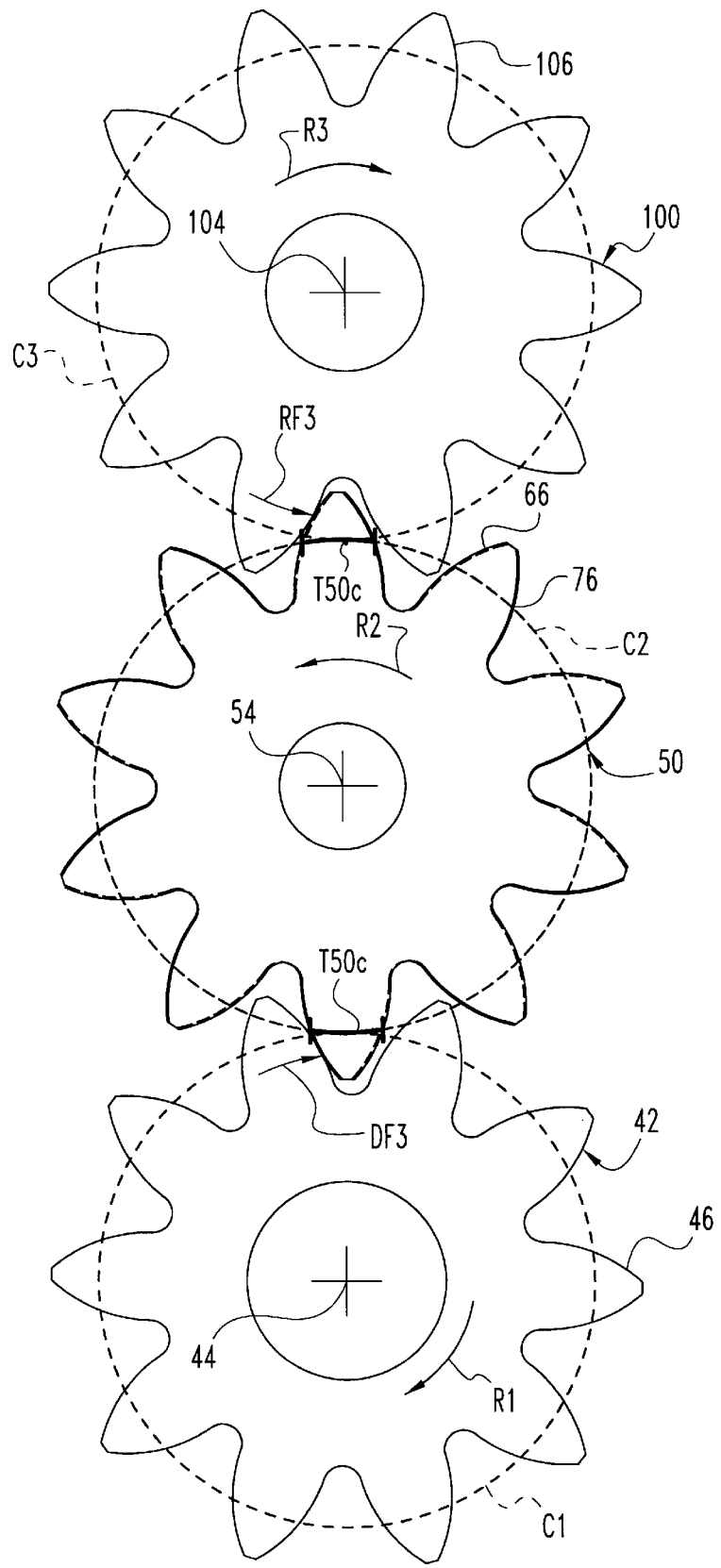

Referring to FIGS. 8A–8C, selected operational states of gears 42, 50, and 100 are schematically depicted with reference numerals representing structure designated by like numerals in FIGS. 1–6; however, fewer and larger teeth are schematically illustrated in these figures to emphasize various features. Referring to FIGS. 8A, gears 42, 50, 100 are in a static (motionless) state relative to each other. Referring to mesh 48, imaginary pitch circles C1, C2, C3 are represented by dashed lines for gears 42, 50, 100, respectively. The circular thickness T50$a$ of a pair of gear teeth 76, 66 of gear 50 is shown as an arc along the companion pitch circle C2. Arrows DF1 represent the forces counter-acting the bias of gear 50 for the depicted static condition in FIG. 8A. The static reaction forces of gear 100 are shown by arrows RF1. Also depicted is the circular thickness T60 of a selected tooth 66, and the circular thickness T70 of a selected tooth 76. It is preferred that circular thickness T60 be nominally less than circular thickness T70 for each tooth 60, 70, respectively. In one preferred embodiment, T60 is at least about two thousands (0.002) of an inch less than T70. More preferably, this difference is at least about four thousands (0.004) of an inch. Most preferably, this difference is in a range of about two to six thousands (0.002–0.006) of an inch.

In FIG. 8B, drive gear 42 is rotating in the direction indicated by arrow R1 to provide a resultant drive force represented by arrow DF2. In response, gear 50 is rotating in the direction indicated by arrow R2 and gear 100 is rotating in the direction indicated by arrow R3. The resultant reaction force presented by gear 100 is represented by arrow RF2. The resultant forces DF2 and RF2 are of sufficient intensity to partially overcome the spring bias, causing compression of springs 81 of gear 50. As a result, the circular thickness T50$b$ of the composite pairs of teeth of gear 50 decreases relative to thickness T50$a$ (T50$b$ is less than T50$a$). As the magnitude of the force transmitted from drive gear 42 increases, gear teeth 66, 76 continue to approach alignment.

In FIG. 8C, the resultant driving force DF3 of gear 42 and reaction force RF3 of gear 100 compresses springs 81 by an amount sufficient to align gear teeth 66 and 76. When so aligned, composite thickness T50$c$ results. T50$c$ is less than both T50$a$ and T50$b$, and is generally equal to the circular thickness T70 of teeth 76. Springs 81 are generally fully compressed in the FIG. 8C configuration; storing energy generally equivalent in amount to springs 81 in the configuration of FIG. 5.

The smaller circular thickness of teeth 66 compared to teeth 76 (T60<T70) prevents loading of teeth 66 beyond the load provided by the compressed springs of FIG. 8C. In contrast, teeth 76 bear any load in excess of the spring load. Limiting the load on teeth 66 to the spring bias generally reduces reverse bending loads commonly resulting from random dimensional differences of tooth pairs having each member nominally sized to the same circular thickness. Preferably, the wider tooth face W70 of each tooth 76 is selected to bear the higher driving loads in excess of the spring bias; however, the total width increase (W60+W70) for gear 50 is typically less than the width increase required to withstand reverse bending loads by a scissor gear that has the same nominal circular thickness for all teeth.

Figure 9:
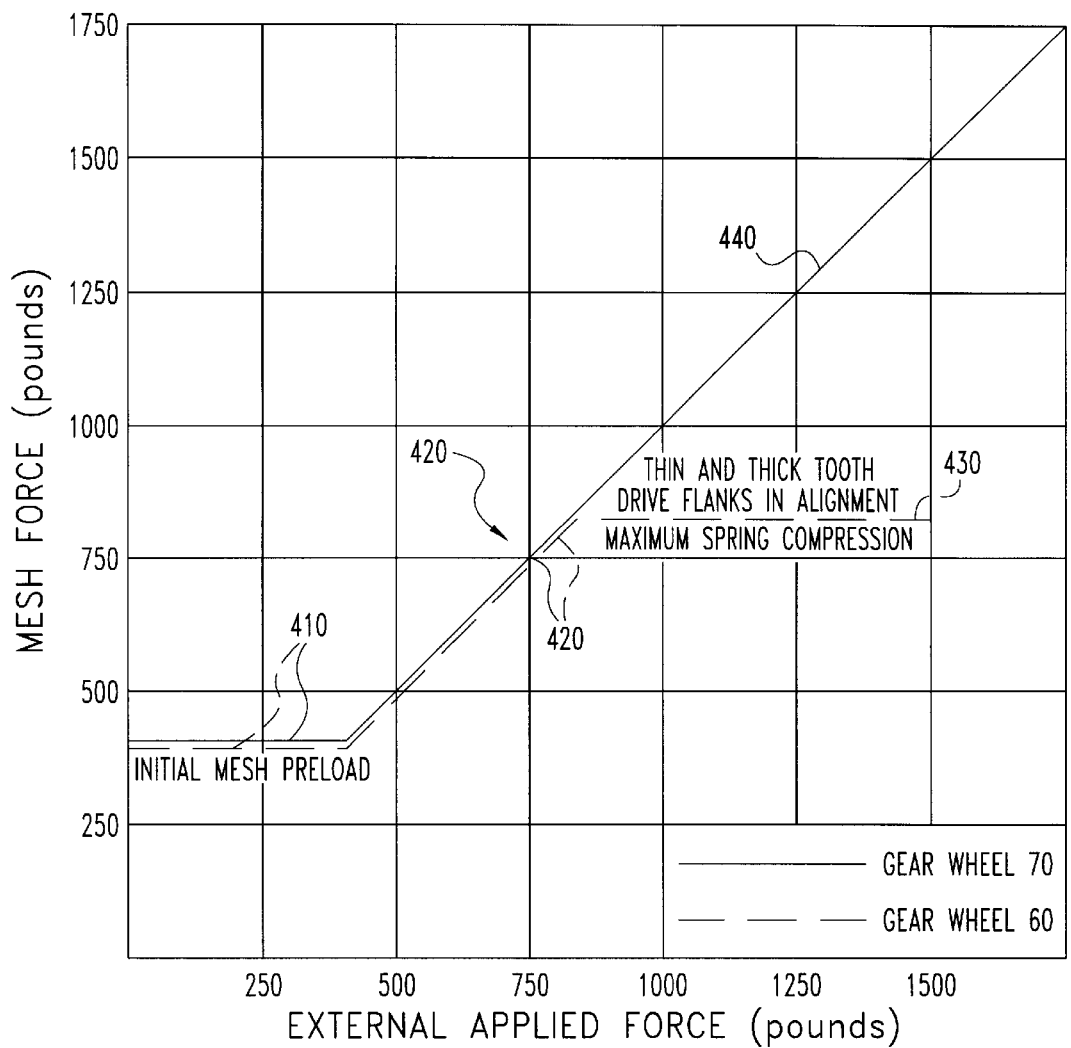
FIG. 9 is a graph illustrating various relationships concerning the operational states shown in FIGS. 8A–8C.

FIG. 9 graphically represents the typical effect of reduced circular thickness T60 compared to circular thickness T70 with load lines 400. The dashed line 400 represents gear wheel 60 and the solid line 400 represents gear wheel 70. Horizontal segments 410 correspond to the pre-loaded bias of gear 50 under the static conditions of FIG. 8A. Sloped segments 420 correspond to the loading of teeth 66, 76 between the static condition of FIG. 8A and the aligned position of FIG. 8C. FIG. 8B represents one point along segments 420. Once loading compresses springs 81 to align teeth as illustrated in FIG. 8C, the loading on teeth 66 of gear wheel 60 flattens to the maximum load of springs 81 as indicated by segment 430. At the same time, the thicker face W70 of teeth 76 bears the high intensity loading as indicated by sloped segment 440. By allowing wheel 70 to handle the high loads and limiting loading of wheel 60 with the circular thickness differential (T70–T60), reverse bending loads are typically reduced.

It has been found that much of the unpleasant noise, such as the "hammering" sounds associated with heavy-duty diesel engines, is due to high impact noise from gear trains associated with those engines. An unexpectedly dramatic change in sound quality is experienced, typically including a reduction in overall noise intensity, when a relatively high bias torque is provided by a scissor gear participating in the gear train. As used herein, "bias torque" is the magnitude of the torque provided by a spring-biased scissor gear assembly. The bias torque is determined as the magnitude of the cross product of the vectors corresponding to a radial distance from the rotational center of the gear to the teeth and the force acting tangential to a circle corresponding to the radius. Typically, the bias torque varies as a function of the amount of loading of the scissor gear bias. Preferably, the bias torque is at a maximum when the gear teeth are generally aligned in opposition to the bias. For the aligned configuration of teeth 66, 76 in FIG. 5, a radial vector T and a force vector F are illustrated which may be used to determine bias torque for assembly 58.

It has been found that a maximum bias torque of at least 100 foot-pounds (ft-lbs) provides improved gear train noise character and intensity. More preferably, a maximum bias torque of at least about 200 ft-lbs is provided. Most preferably, a maximum bias torque of at least about 500 ft-lbs is provided. In one most preferred embodiment, gear 50 is configured with a maximum bias torque of about 700 ft-lbs, and gear 200 is configured with a maximum bias torque of about 200 ft-lbs. In many instances, the bias torque of the present invention obviates the need to use expensive enclosures and panels to mute unpleasant noise.

Figure 10:
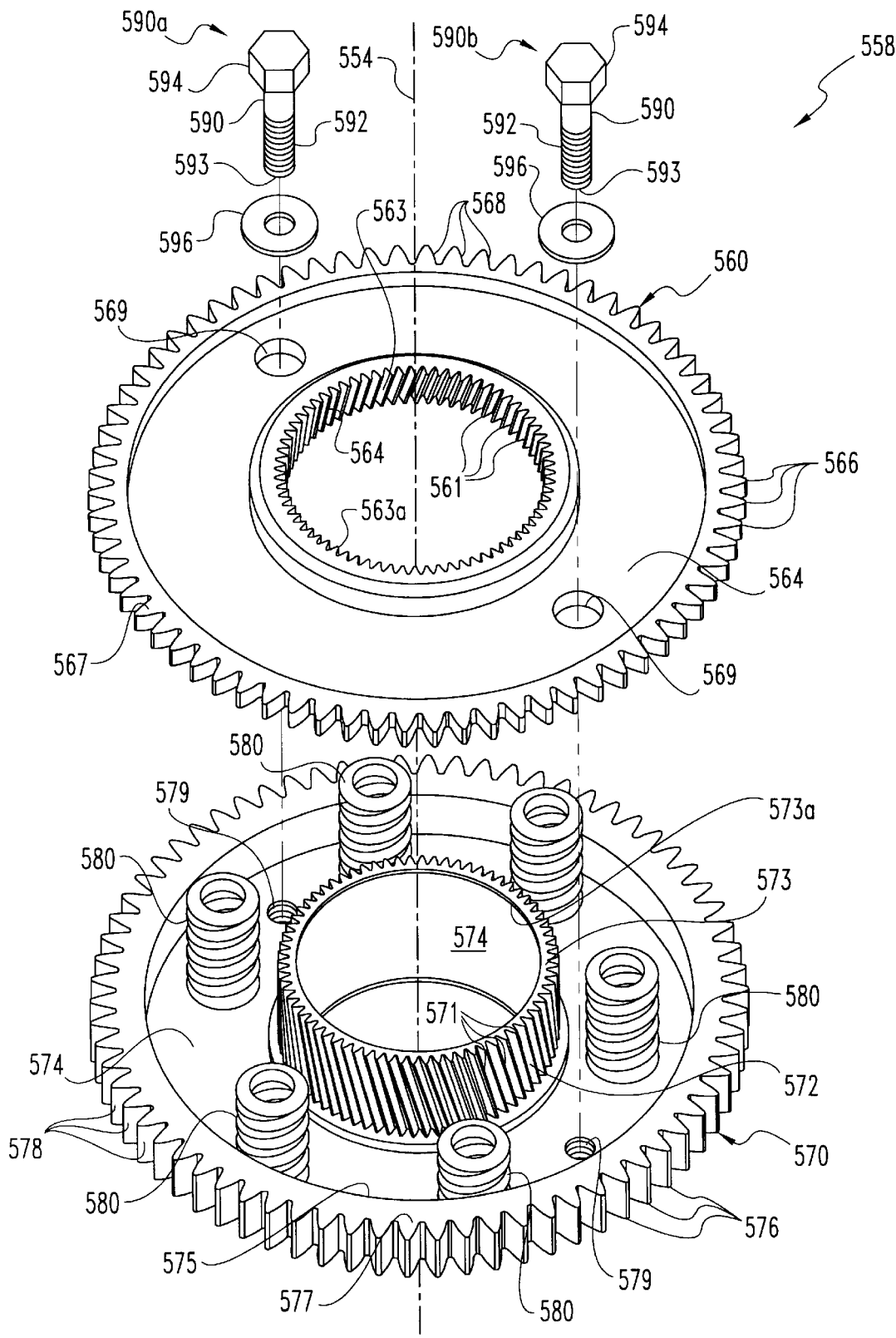
FIG. 10 is an exploded perspective view of an anti-lash gear assembly of an alternative embodiment of the present invention.

FIG. 10 provides an exploded perspective view of anti-lash gear assembly 558 about rotational center 554 of an alternative embodiment of the present invention. Assembly 558 includes gear wheel 560 with splines 561 defined by inner cylindrical surface 564 of hub 563. Hub 563 defines opening 563a therethrough. Splines 561 are of the helical type oriented about center 554 and inclined relative to the rotational axis of wheel 560. Hub 563 is integrally connected to web 564. A number of circumferentially disposed teeth 566 are defined by rim 567 which is also integrally connected to web 564. Teeth 566 are generally evenly spaced apart from each other about center 554 and each have generally the same size and shape. Between adjacent teeth 566 are gaps 568 which are also generally evenly spaced apart from one another and have generally the same shape and size. Web 564 of wheel 560 defines two opposing apertures 569 therethrough.

Assembly 558 also includes wheel 570. Wheel 570 includes splines 571 defined by outer cylindrical outer surface 572 of hub 573. Splines 561 are of the helical type oriented about center 554 and inclined relative to the rotational axis of wheel 570. Splines 571 are inclined in generally the same manner as splines 561 to mate therewith. Hub 573 is configured to fit within opening 563a of hub 563 to mate splines 561 and 571. Hub 573 defines opening 573a surrounded by inner cylindrical surface 574 for establishing a rotational bearing relationship with a mounting shaft. Wheel 570 also includes web 574 integrally connected to hub 573. Teeth 576 are defined by rim 577 which is integrally connected to web 574. Teeth 576 are generally evenly spaced apart from one another about rotational center 554 and each have generally the same size and shape. Teeth 576 define gaps 578 therebetween. Gaps 578 are generally evenly spaced apart from one another and each have generally the same size and shape. Collectively, hub 573, web 574, and rim 571 define a cylindrical recess 575. Web 564 defines two opposing threaded recesses 579 each corresponding to one of apertures 569.

Coil springs 580 are each placed in recess 575 and are generally evenly spaced apart from one another about center 554 between hub 573 and rim 577. Adjustment devices 590a, 590b are included which each have adjustment bolt 590 with threaded stem 592. Stem 592 has end 593 opposing head 594. Devices 590a, 590b each include washer 596 configured for passage of stem 592 therethrough. In contrast, head 594 is sized so that it will not pass through washer 596. Also, the outer diameter of washer 596 is dimensioned so that it will not pass through aperture 569. Aperture 569 is sized to provide ample clearance for stem 592, permitting selective positioning of stem 592 therein. Threaded recesses 579 are each configured for engagement by a corresponding one of stems 592.

Figure 11A:
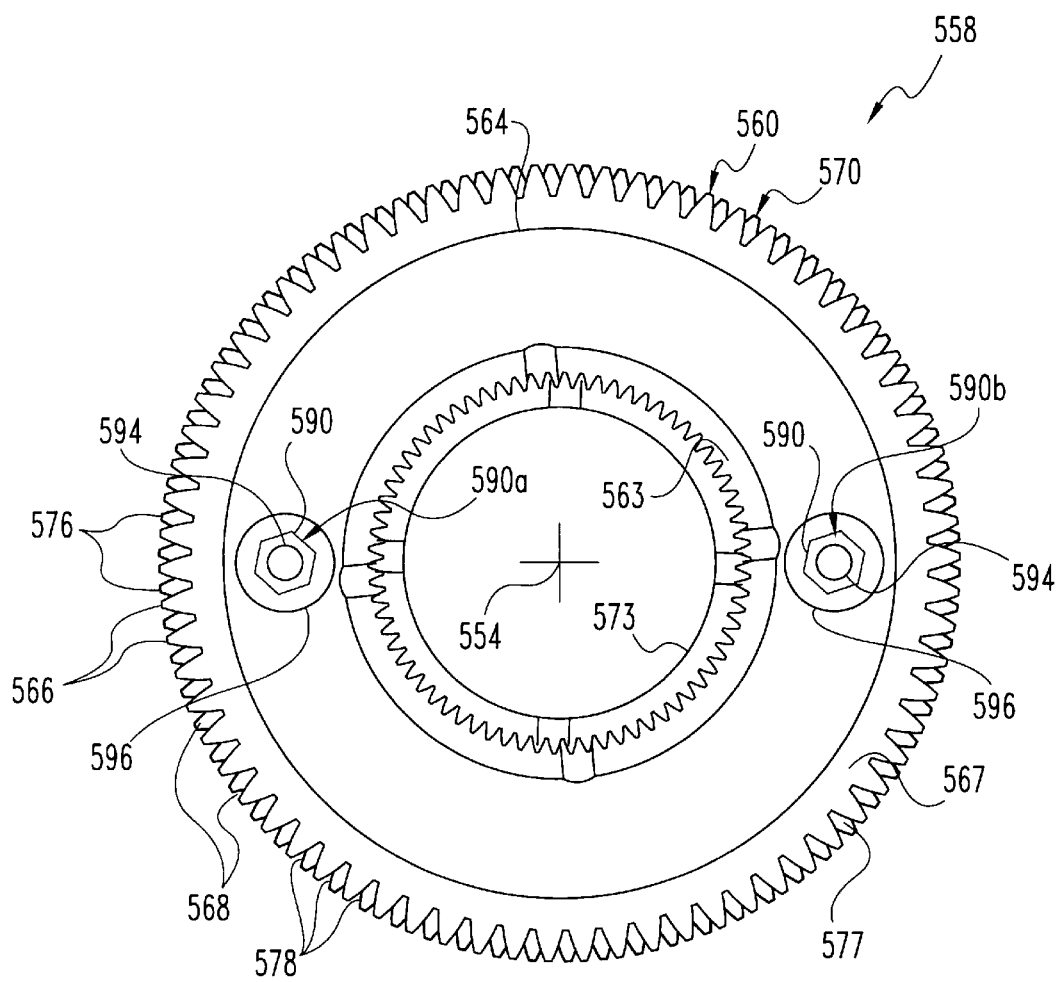
FIG. 11A is a top plan view of the anti-lash gear assembly of FIG. 10 in an unaligned configuration.
Figure 11B:
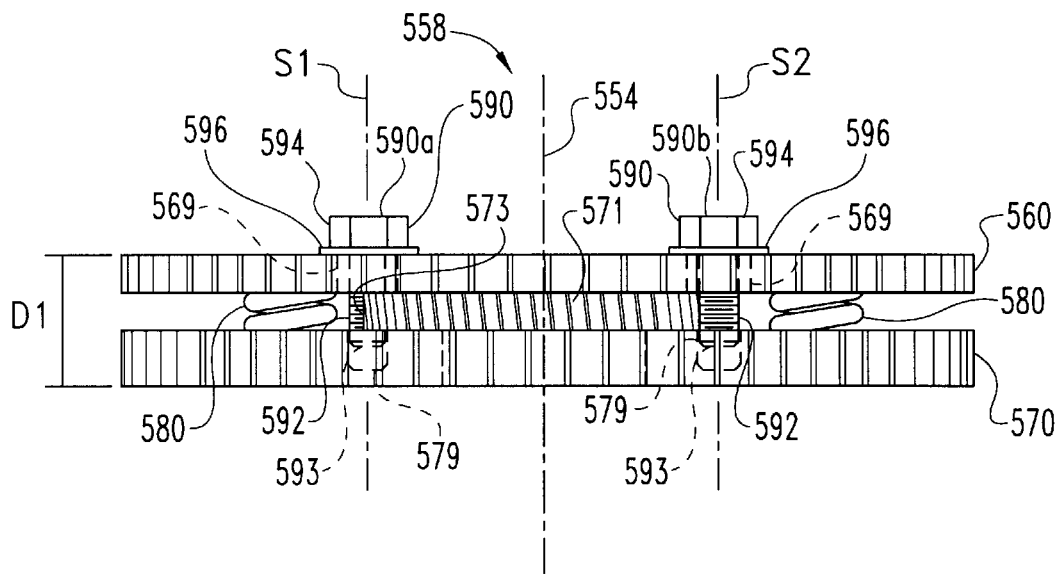
FIG. 11B is a side elevational view of the anti-lash gear assembly of FIG. 11A.

Referring to FIG. 11A, an unaligned position of assembly 558 is illustrated that shows teeth 566 and 576 of wheels 560 and 570, respectively, out of register similar to the embodiment illustrated in FIG. 4. Referring additionally to FIG. 11B, a side elevational view of assembly 558 in the unaligned configuration is illustrated. Splines 561 of wheel 560 engage splines 571 of wheel 570. For each device 590a, 590b, stems 592 have corresponding longitudinal stem axes S1, S2. Stems 592 are inserted through corresponding washers 596 and apertures 596 to initially engage a corresponding threaded recess 579. Springs 580 are not substantially compressed in the configuration of FIGS. 11A and 11B.

Figure 12B:
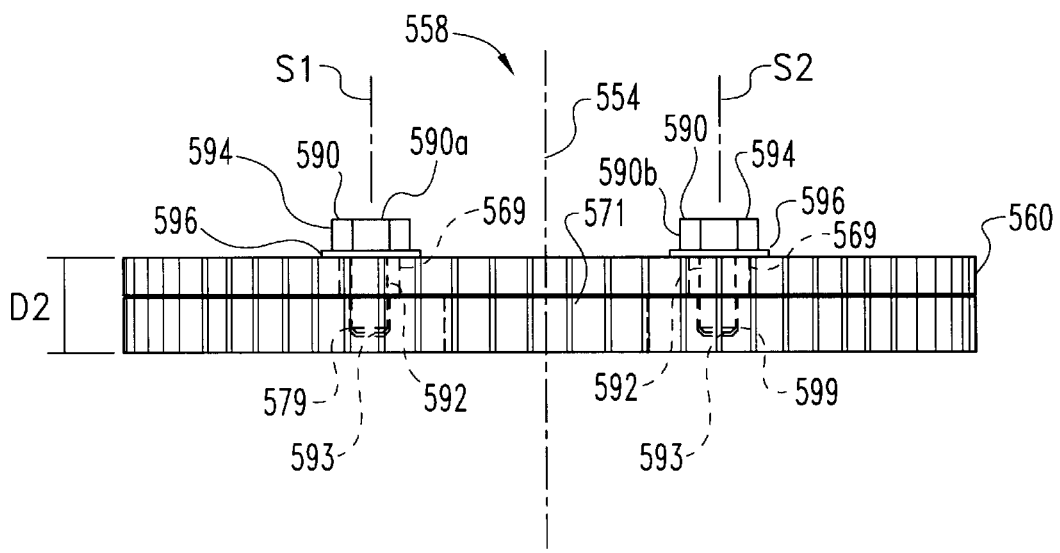
FIG. 12B is a side elevational view of the anti-lash gear assembly of FIG. 12A.
Figure 12A:
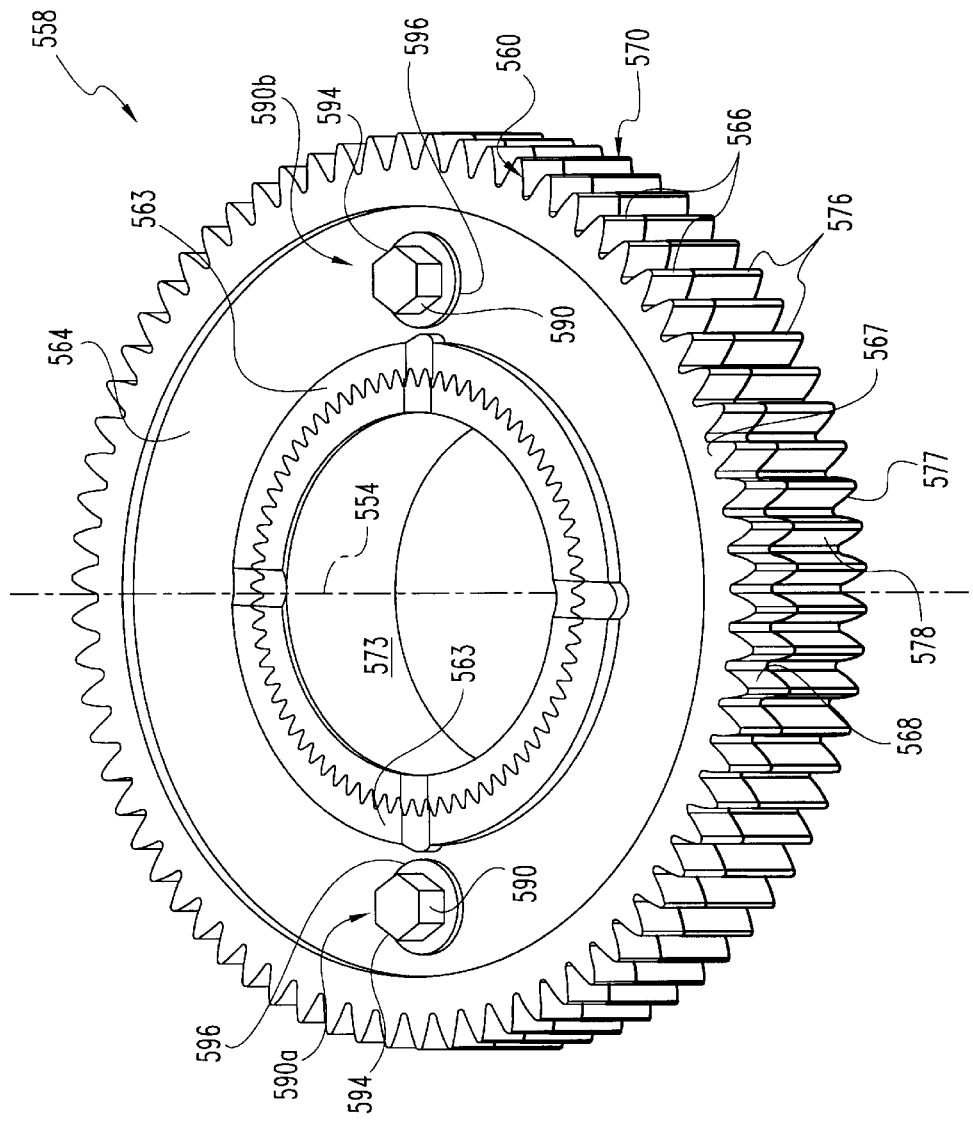
FIG. 12A is a top plan view of the anti-lash gear assembly of FIG. 10 in an aligned configuration.

Referring additionally to FIGS. 12A and 12B, a perspective view and a side elevational view of assembly 558 in an aligned configuration are illustrated, respectively. This aligned configuration generally corresponds to the aligned configuration of assembly 58 illustrated in FIG. 5. To provide alignment of assembly 558, stems 592 of adjustment devices 590a, 590b are further threaded into recesses 579 to compress springs 580 between wheel 560 and 570. As springs 581 are compressed, the inclines of mating splines 561, 571 provide a ramping action that generally converts the translational motion of devices 590a, 590b to a rotational motion of wheels 560, 570. As stems 592 of devices 590a, 590b are unthreaded, the compressed springs 580 provide a force which rotates wheels 560 and 570 in the opposite direction due to the engagement of splines 561, 571. Assembly 558 is configured so that teeth 566 and 576 are generally aligned when stems 592 are fully threaded into recesses 579. This aligned orientation of assembly 558 is also preferably configured to provide a selected maximum bias torque. The distance wheels 560 and 570 occupy along stem axes S1 and S2 changes from D1 for the unaligned position shown in FIG. 11B to D2 for the aligned position illustrated in FIG.

12B, where D1 is greater than D2. Notably, D2 is the minimum distance occupied by wheels 560, 570 of assembly 558 along stem axes S1, S2. Thus, wheels 560, 570 rotate relative to each other in accordance with the distance occupied by the wheels 560, 570 along the rotational axis corresponding to center 554.

Preferably, the number of teeth 566 is the same as the number of teeth 576. It is also preferred that the number of helical splines 561, 571 be the same as the number of teeth 566, 576, respectively. Identical quantities of teeth and splines simplifies assembly by avoiding the need to index splines 571, 561 to assure that alignment of teeth 566 and 576 coincides with high spring compression. In other embodiments, aperture 569 may be configured as a non-circular opening as opposed to the generally circular opening illustrated in FIG. 10. In one alternative embodiment, aperture 569 is configured as an arcuate slot with a bend radius extending from center 554.

Splines 561, 571 may be provided in different locations besides hubs 563, 573. By way of non-limiting example, arcuate slots defined by one wheel may have an inner surface defining splines configured to mate with splines defined by a flange extending from the other wheel into these slots. Notably, one or more segments of mating spines oriented about the rotational axis are capable of providing the relative rotation of the gear wheels without needing to encircle the axis.

Similar to the embodiment of assembly 58, assembly 558 provides an alignment device which provides for selectively aligning teeth of two gear wheels of an anti-lash gear assembly by opposing the spring bias of the assembly. Stems 592 are tightened down to provide the aligned configuration of FIGS. 12A and 12B for installation. Once assembly 558 is meshed with another gear, gear 42 for example, stem 592 of each device 590a, 590b is loosened to permit relative rotation of wheels 560 and 570 to take-up lash of the mating gear. This loosened position would appear similar to the configuration of FIGS. 11A and 11B, but would preferably provide clearance between head 594 and washer 596 of each bolt 590 to accommodate changing lash conditions of a corresponding mesh. In one embodiment, devices 590a, 590b are removed once assembly 558 is installed in a mesh with another gear. This embodiment relies on the mesh to oppose the bias.

Each assembly 58, 558 is configured with an adjustment device having a threaded stem coupled to one wheel that extends along a stem axis. These devices further include a head coupled to the stem and configured for adjustable positioning relative to the wheel. Generally, assemblies 58 and 558 may be configured to be interchangeable with regard to other features of the present invention. Furthermore, assembly 58 or 558 may be adapted for use with anti-lash gear 200. In other embodiments of assemblies 58, 558; bolts 90, 590 may be replaced by a threaded stem fixed to one of the wheels with a nut threaded thereon to provide a movable head. This nut is positioned along the stem to selectively engage the other wheel. In still other embodiments of the present invention, neither anti-lash assembly may be utilized. Indeed in some alternative embodiments of the present invention, a conventional scissor gear assembly may be employed.

All publications, patents, and patent applications cited in this specification are herein incorporated by reference as if each individual publication, patent, or patent application was specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An anti-lash gear assembly, comprising:

(a) a first gear wheel with a first number of circumferentially disposed teeth;

(b) a second gear wheel engaging said first wheel with a spring bias configured to yieldingly rotate said first and second wheels relative to each other about a generally common rotational axis, said second wheel defining a second number of teeth each being paired to a corresponding one of said first teeth to provide a number of composite teeth each having a variable size to reduce backlash when engaged in a mesh; and (c) an adjustment device with a threaded stem coupled to said first wheel and a head coupled to said stem, said head having a first selectable position to form a bearing relationship with said second wheel in opposition to said spring bias to align said first and second teeth for installation.

2. The assembly of claim 1, wherein said head has a second selectable position to permit rotation of said first and second wheel relative to each other in response to said bias after installation of the assembly to mesh with another gear.

3. The assembly of claim 2, wherein said device includes a bolt with said stem and said head, said first wheel defines a threaded bore, and at least a portion of said stem is threaded into said bore to position said head between said bore and said second wheel.

4. The assembly of claim 3, wherein said head contacts said second wheel in said first position and said first wheel in said second position.

5. The assembly of claim 1, wherein:

said first wheel defines a threaded bore and has a first hub defining a first number of helical splines;

said second wheel defines an aperture configured to overlap said threaded bore and has a second hub defining a second number of helical splines, said first splines and said second splines engaging each other; and said device includes a bolt having said stem opposing said head and a washer, said stem passing through said washer and said aperture to threadingly engage said bore for selectively clamping said washer and said second wheel between said head and said first wheel in said first position.

6. The assembly of claim 1, wherein said spring bias is configured to provide a maximum bias torque of at least about 100 foot-pounds relative to a radius from said rotational axis to said first and second teeth, said first teeth each have a first circular thickness and said second teeth each have a second circular thickness, and said first thickness is at least about 0.002 inch greater than said second thickness.

7. An anti-lash gear assembly, comprising:

(a) a first gear wheel defining a first number of circumferentially disposed teeth and a first number of helical splines;

(b) a second gear wheel defining a second number of circumferentially disposed teeth and a second number of helical splines, said second splines engaging said first splines with a spring bias to yieldingly rotate said first and second wheels relative to each other about a generally common rotational axis, said second teeth being paired to a corresponding one of said first teeth to provide a number of composite teeth which vary in size in accordance with rotation of said first and second wheels relative to each other; and (c) an alignment device coupled to at least one of said first and second wheels, said device being configured to selectively align said first and second teeth.

8. The assembly of claim 7, wherein said device includes a threaded stem carried by said first wheel and a head, said device being configured to selectively position said head relative to said first wheel, said head having a position to provide a bearing relationship with said second wheel in opposition to said bias to generally align said first and second teeth for installation.

9. The assembly of claim 7, wherein said first wheel has a first hub defining said first splines and said second wheel has a second hub defining said second splines, and said composite teeth vary in size in accordance with distance occupied by said first and second wheels along said rotational axis.

10. The assembly of claim 7, wherein:
said first wheel defines a threaded bore;
said second wheel defines an aperture overlapping said bore; and
said device includes a bolt having a stem opposing a head and a washer, said stem passing through said washer and said aperture to threadingly engage said bore for selectively clamping said washer and said second wheel between said head and said first wheel.

11. The assembly of claim 7, wherein said spring bias is configured to provide a maximum bias torque of at least about 100 foot-pounds relative to a radius from said axis to said first and second teeth, said first teeth each have a first circular thickness and said second teeth each have a second circular thickness, and said first thickness is at least about 0.002 inch greater than said second thickness.

12. An anti-lash gear assembly, comprising:
(a) a first gear wheel with a first number of circumferentially disposed teeth;
(b) a second gear wheel engaging said first wheel with a spring bias configured to yieldingly rotate said first and second wheels relative to each other about a generally common rotational axis, said second wheel defining a second number of teeth each being paired to a corresponding one of said first teeth to provide a number of composite teeth of variable thickness to reduce backlash; and
(c) an alignment device with a threaded stem coupled to said first wheel and a head, said head being selectively positionable relative to said first wheel to provide an adjustable bearing relationship with said second wheel in opposition to said spring bias and correspondingly vary alignment of said first and second teeth.

13. The assembly of claim 12, wherein:
said first wheel defines a threaded bore and has a first hub defining a first number of helical splines;
said second wheel defines an aperture configured to overlap said threaded bore and has a second hub defining a second number of helical splines, said first splines and said second splines engaging each other; and said device includes a bolt having said stem opposing said head and a washer, said stem passing through said washer and said aperture to threadingly engage said bore.

14. The assembly of claim 12, wherein said first wheel defines a threaded bore and said device includes a bolt with said stem and said head, and said stem is at least partially threaded into said bore.

15. The assembly of claim 12, wherein said spring bias is configured to provide a maximum bias torque of at least about 100 foot-pounds relative to a radius from said axis to said first and second teeth, said first teeth each have a first circular thickness, and said second teeth each have a second circular thickness nominally less than said first circular thickness.

16. The assembly of claim 12, wherein said spring bias is at least partially provided by a number of coil springs compressed between said first and second wheels.

17. An anti-lash gear assembly, comprising:
a first gear wheel defining a first number of circumferentially disposed teeth and a first number of splines; and
a second gear wheel defining a second number of circumferentially disposed teeth and a second number of splines, said first and second splines engaging each other about a generally common rotational axis, said first and second splines being inclined relative to said axis and being configured to rotate said first and second wheels relative to each other, said second teeth each being paired to a corresponding one of said first teeth to provide a number of composite teeth which vary in size with rotation of said first and second wheels relative to each other.

18. The assembly of claim 17, wherein said number of first teeth, said number of second teeth, said number of first splines, and said number of second splines are equal.

19. The assembly of claim 17, wherein said first and second wheels engage each other with a bias at least partially provided by a number of coil springs positioned therebetween, said springs each being oriented to exert a force acting in a direction generally parallel to said rotational axis.

20. The assembly of claim 19, further comprising an adjustment device carried with said first wheel, said device being configured to selectively align said first and second teeth in opposition to said bias.

21. The assembly of claim 20, wherein said device includes a bolt with a threaded stem opposing a head.

22. The assembly of claim 19, wherein said bias is configured to provide a maximum bias torque of at least about 100 foot-pounds relative to a radius from said rotational axis to said first and second teeth, said first teeth each have a first circular thickness and said second teeth each have a second circular thickness, and said first thickness is at least about 0.002 of an inch greater than said second thickness.

23. The assembly of claim 17, wherein said first wheel has a first hub defining said first splines and said second wheel has a second hub defining said second splines, and said composite teeth vary in size in accordance with distance occupied by said first and second wheels along said rotational axis.

* * * * *